United States Patent
Yu et al.

(10) Patent No.: US 9,126,597 B2
(45) Date of Patent: Sep. 8, 2015

(54) HILL HOLD DECAY

(71) Applicant: Robert Bosch GmbH, Stuttgart (DE)

(72) Inventors: Jingsheng Yu, Northville, MI (US); Ryan Kuhlman, Novi, MI (US); Pablo Luis Guarnizo Martinez, Novi, MI (US); Louis A. Rhodes, Farmington Hills, MI (US); David M. McGuire, Birch Run, MI (US); Miles A. Christmas, Commerce, MI (US); Patrick G. Larochelle, White Lake, MI (US); Mark C. Luscomb, Fenton, MI (US)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 14/210,959

(22) Filed: Mar. 14, 2014

(65) Prior Publication Data

US 2014/0277980 A1    Sep. 18, 2014

Related U.S. Application Data

(60) Provisional application No. 61/784,075, filed on Mar. 14, 2013.

(51) Int. Cl.
| | |
|---|---|
| *B60T 7/12* | (2006.01) |
| *G05D 1/00* | (2006.01) |
| *B60W 30/18* | (2012.01) |
| *B60T 8/17* | (2006.01) |
| *B60T 17/22* | (2006.01) |

(52) U.S. Cl.
CPC .......... *B60W 30/18118* (2013.01); *B60T 7/122* (2013.01); *B60T 8/17* (2013.01); *B60T 17/221* (2013.01); *B60T 2201/06* (2013.01)

(58) Field of Classification Search
CPC .............. B60W 30/18118; B60T 8/17; B60T 2201/06; B60T 7/122; B60T 17/221
See application file for complete search history.

(56) References Cited

U.S. PATENT DOCUMENTS

| | | |
|---|---|---|
| 5,997,108 A | 12/1999 | Claussen et al. |
| 6,428,120 B1* | 8/2002 | Holl .............................. 303/191 |
| 6,616,572 B2 | 9/2003 | Suzuki |
| 7,399,040 B2 | 7/2008 | Schmidt |
| 7,460,941 B2 | 12/2008 | Sychra et al. |
| 7,762,633 B2 | 7/2010 | Maskell et al. |
| 8,016,720 B2 | 9/2011 | Sokoll |

(Continued)

FOREIGN PATENT DOCUMENTS

| | | |
|---|---|---|
| DE | 102005021492 | 11/2006 |
| GB | 2348682 | 11/2000 |
| WO | 0114186 | 3/2001 |

*Primary Examiner* — Mary Cheung
(74) *Attorney, Agent, or Firm* — Michael Best & Friedrich LLP

(57) ABSTRACT

A hill hold decay (HDD) system of a vehicle. The system includes a longitudinal acceleration sensor, a wheel speed sensor, a brake pedal detector, a gas pedal detector, a gear sensor, and a controller. The controller is configured to determine the vehicle has come to a standstill, determine a slope of the ground the vehicle is on, determine a direction of travel of the vehicle is downhill, detect a release of a brake release a brake force applied to a plurality of wheels of the vehicle at a constant first rate, determine a speed of the vehicle has reached a minimum threshold, release the brake force at a second rate as long as the speed of the vehicle is increasing, determine the speed of the vehicle has reached a maximum threshold, and release the brake force.

18 Claims, 6 Drawing Sheets

(56) References Cited

U.S. PATENT DOCUMENTS

| | | |
|---|---|---|
| 8,224,548 B2 * | 7/2012 | Ludwig et al. .................. 701/78 |
| 8,255,138 B2 | 8/2012 | Bach et al. |
| 8,352,126 B2 | 1/2013 | Blaise et al. |
| 2004/0024513 A1 * | 2/2004 | Aizawa et al. .................. 701/70 |
| 2004/0209733 A1 | 10/2004 | Bates et al. |
| 2009/0018739 A1 * | 1/2009 | Ohmori et al. .................. 701/70 |
| 2009/0309414 A1 | 12/2009 | Braeuer et al. |
| 2010/0023236 A1 | 1/2010 | Morgan et al. |
| 2010/0090522 A1 | 4/2010 | Bensch et al. |
| 2010/0292902 A1 | 11/2010 | Bach et al. |
| 2011/0125376 A1 | 5/2011 | Chappell et al. |
| 2011/0202249 A1 | 8/2011 | Pothin et al. |
| 2013/0144499 A1 * | 6/2013 | Dietzel et al. .................. 701/70 |

* cited by examiner

Conventional slope estimation is affected by the vehicle pitch movement when driver starts braking, that provokes a temporary wrong slope calculation.

HILL HOLD DECAY

RELATED APPLICATION

This application claims the benefit of co-pending U.S. Provisional Patent Application No. 61/784,075, filed Mar. 14, 2013, the content of which is hereby included by reference.

BACKGROUND

The present invention relates a hill hold decay (HHD) system for controlling release of brake force during downhill acceleration of a vehicle after standstill.

SUMMARY

In one embodiment, the invention provides a method of controlling vehicle acceleration down a slope from a standstill. The method includes determining that the vehicle is at standstill, determining that the vehicle is heading down a slope, determining a rate of decrease of a brake force, detecting a release of a brake by a driver, reducing the braking force based at the determined rate of decrease, detecting a speed of the vehicle, determining that the detected speed exceeds a predetermined minimum speed, holding the brake force constant after determining that the detected speed exceeds a predetermined minimum speed, detecting a drive off condition, and reducing the braking force to zero when the drive off condition is detected.

In one embodiment, the invention provides a hill hold decay (HDD) system of a vehicle. The system includes a longitudinal acceleration sensor, a wheel speed sensor, a brake pedal detector, a gas pedal detector, a gear sensor, and a controller. The wheel speed sensor is configured to detect the speed of the vehicle. The brake pedal detector is configured to detect a pressure applied to a brake pedal. The gas pedal detector is configured to detect a pressure applied to a gas pedal. The gear sensor configured to sense a gear the vehicle is in. The controller is configured to receive an indication of the longitudinal acceleration of the vehicle from the longitudinal acceleration sensor, an indication of the speed of the vehicle from the wheel speed sensor, an indication of the pressure on the brake pedal from the brake pedal detector, an indication of the pressure on the gas pedal from the gas pedal sensor, and an indication of the gear the vehicle is in from the gear sensor.

The controller is also configured to determine the vehicle has come to a standstill, determine a slope of the ground the vehicle is on, determine a direction of travel of the vehicle is downhill, detect a release of a brake, release a brake force applied to a plurality of wheels of the vehicle at a constant first rate, determine a speed of the vehicle has reached a minimum threshold, release the brake force at a second rate as long as the speed of the vehicle is increasing, determine the speed of the vehicle has reached a maximum threshold, and release the brake force.

In another embodiment the invention provides a method of controlled acceleration of a vehicle. The method includes determining the vehicle has come to a standstill, determining a slope of the ground the vehicle is on, determining a direction of travel of the vehicle is downhill, detecting a release of a brake, releasing a brake force applied to a plurality of wheels of the vehicle at a constant first rate, determining a speed of the vehicle has reached a minimum threshold, releasing the brake force at a second rate as long as the speed of the vehicle is increasing, determining the speed of the vehicle has reached a maximum threshold, and releasing the brake force.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Hill Hold Decay (HHD) is a comfort function which is activated following a "vehicle standstill" on a downhill grade. The objective of HHD is to ensure a controlled acceleration of the vehicle as it coasts down a hill. HHD controls the acceleration by controlling a bleed of braking force previously built-up by the driver.

During HHD, if the system detects a driver's intention to drive off, the braking force is immediately dropped to zero (i.e., the HHD function is deactivated). The driver's intention to drive off is detected by the throttle position reaching a predefined level.

Figure 1:
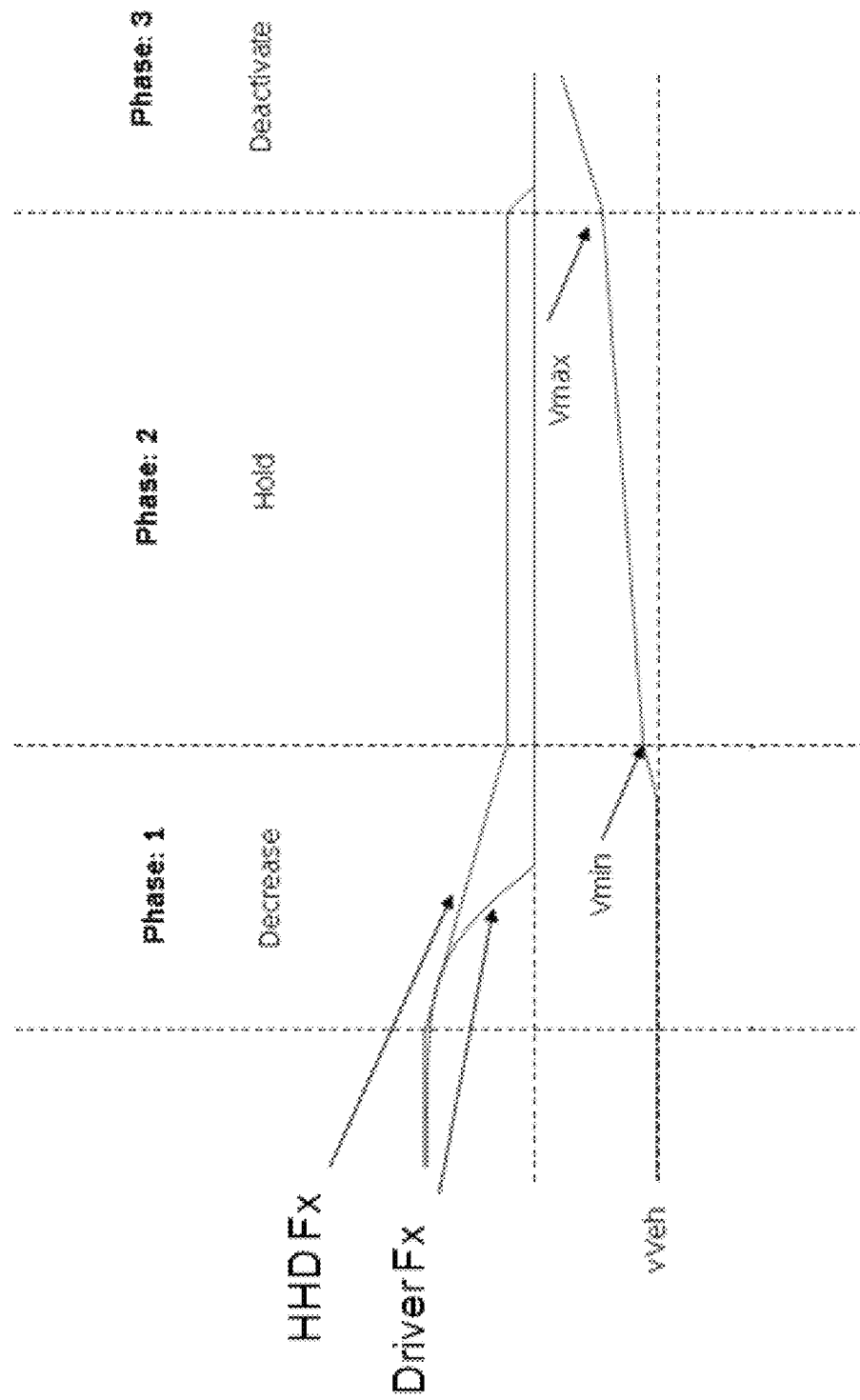
FIG. 1 is a graph showing an HHD operation.

Activation of HHD takes place automatically. FIG. 1 is a graph showing the HHD operation.

Phase 1: Once the driver releases the brake pedal after the vehicle is in standstill, and with the vehicle headed downhill (e.g., the vehicle is pointed downhill and the transmission is in "Drive" or with the vehicle is pointed uphill and the transmission is in "Reverse") the brake force, starting from the brake force requested by the driver during standstill, is released at a constant rate until the vehicle starts rolling above a predetermined speed (vehicle speed (vVeh)>minimum speed (Vmin)). The brake force is reduced at a rate (HHDFx) determined by the HHD system (i.e., an HHD slope).

Phase 2: The HHD transitions to phase 2 when the the vehicle speed exceeds the predetermined minimum speed (vVeh>Vmin). The brake force at the time the HHD transitions to phase 2 is held until the HHD system enters phase 3. The intention in this phase is to keep the vehicle at a constant acceleration; if the vehicle velocity decreases for whatever reason then the brake force will be decreased until the vehicle speed increases above Vmin.

Phase 3: The HHD system transitions to phase 3 when the driver indicates an intention to drive off by pressing the acceleration pedal, the driver shifts into a gear to change the intended drive direction, or the vehicle speed exceeds a predetermined maximum speed (Vmax) (i.e., vVeh>Vmax). In phase 3 the brake force is dropped to zero.

The brake force requested by the driver and HHD can be implemented hydraulically by increasing the brake fluid pressure in the calipers or as a regenerative brake torque.

The HHD function meets the following requirements:

HHD activates only if the driver brakes and stops the vehicle to standstill using the brake pedal.

HHD activates only when the driver requested direction is downhill.

HHD deactivates and releases the brake force when the vehicle velocity goes above an upper velocity limit (Vmax).

HHD avoids stopping the vehicle after the driver releases the brake pedal; hence the brake force is decreased when the vehicle velocity goes below a defined limit (Vmin).

HHD is active only if the HHD slope is higher than an HHD slope activation threshold.

HHD requests a hold of the brake force on all wheels equally.

HHD holds and is able to control the decrease of the brake force.

The HHD function doesn't build up brake force, and as soon as the vehicle velocity goes above the upper velocity threshold the brake force is ramped out.

As long as the driver is holding the brake pedal in standstill the HHD starting brake force corresponds to the maximum force requested by the driver. The maximal hold force is limited by the HHD slope. The driver has to request enough brake force to hold the vehicle in standstill before releasing the brake pedal in order to activate HHD functionality.

Figure 2:
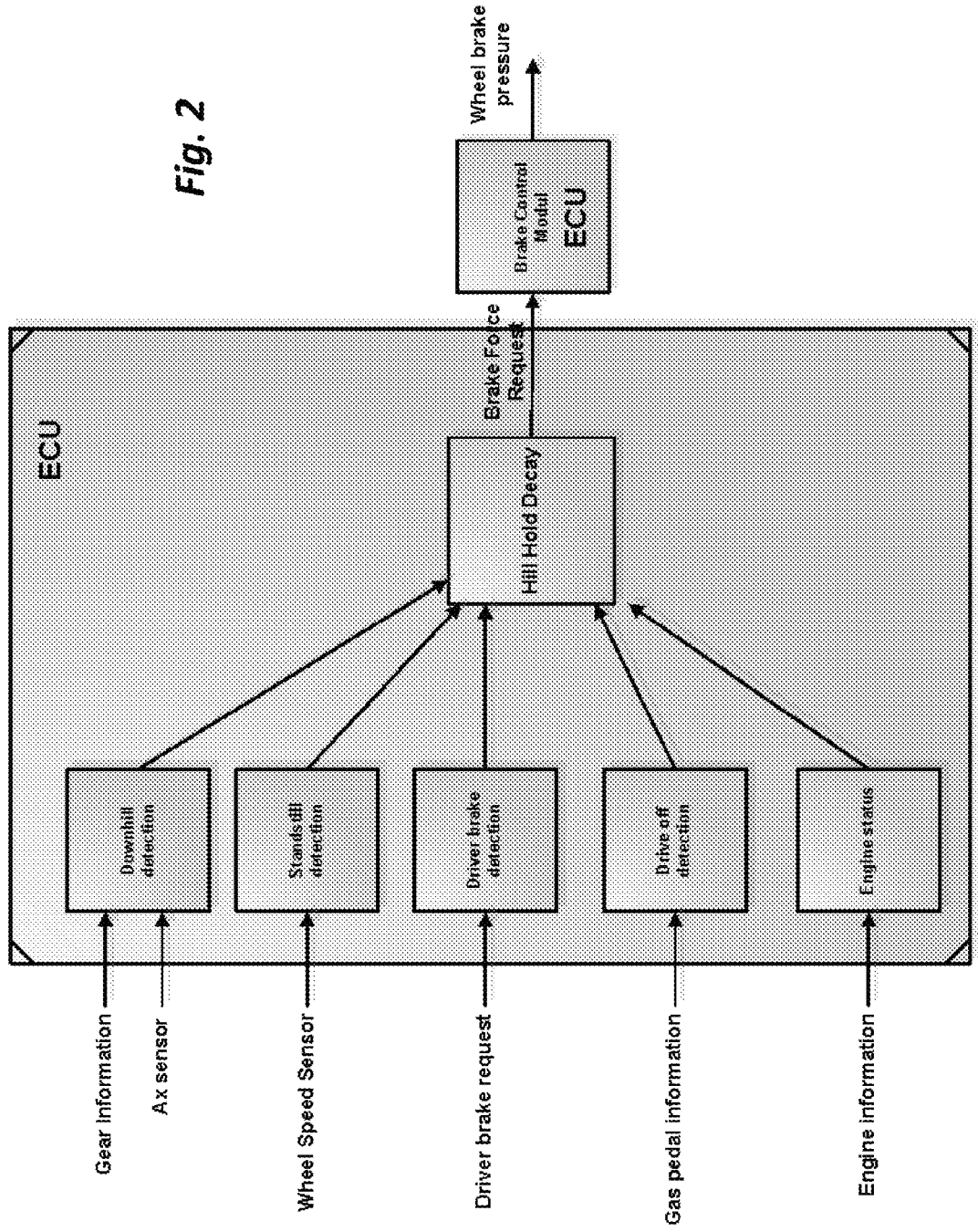
FIG. 2 is a block diagram of a function topology of an HHD system.

FIG. 2 shows the function topology and which information is needed to execute the function. The function could run in an ECU where the gear Information, Ax Sensor data, driver brake request, brake force, gas pedal and engine information are received or/and estimated, after that the brake force request is sent to another ECU responsible for the implementation and modulation of the brake force in the vehicle wheels. In some embodiments, only one ECU performs all the tasks.

The HHD uses a slope estimation to calculate the necessary hold force and the brake force reduction rates in the different function activation phases. This estimation is based on information coming from a longitudinal acceleration sensor and wheel speed sensors. The vehicle acceleration is subtracted from the deceleration provided by the longitudinal acceleration sensor in order to calculate the slope component of the acceleration. This calculation only works if the vehicle is in standstill or on a constant accelerated movement (i.e., a constant velocity). The sensor signal is very sensitive to perturbation caused by bumpy roads, vehicle stiffness body etc.

When the vehicle is coming to standstill, due to the stiffness of the car body the sensor signal is highly disturbed and very noisy causing the above mentioned method to calculate the slope to not be reliable. Accordingly, an alternative method must be used. A wrong slope calculation can cause a hold force that is too small, and the vehicle may start rolling back, and a slope miscalculation can cause the vehicle to hold unnecessarily on flat ground.

The goal is to make sure that when the vehicle comes to a stop the slope estimated is reliable to a point that a false detection is discarded. Thus, a new definition of vehicle stability for the calculation of the slope is used. The above standard method is used only if the vehicle is in a stable state (defined by the jerk and jounce of an Ax-sensor signal, i.e., a first and second derivative of the vehicle deceleration). The ax-sensor signal is used because it provides information on perturbation in the vehicle car body. The observation of these two state variables of the vehicle determines when the estimation of the slope can be done.

Figure 3:
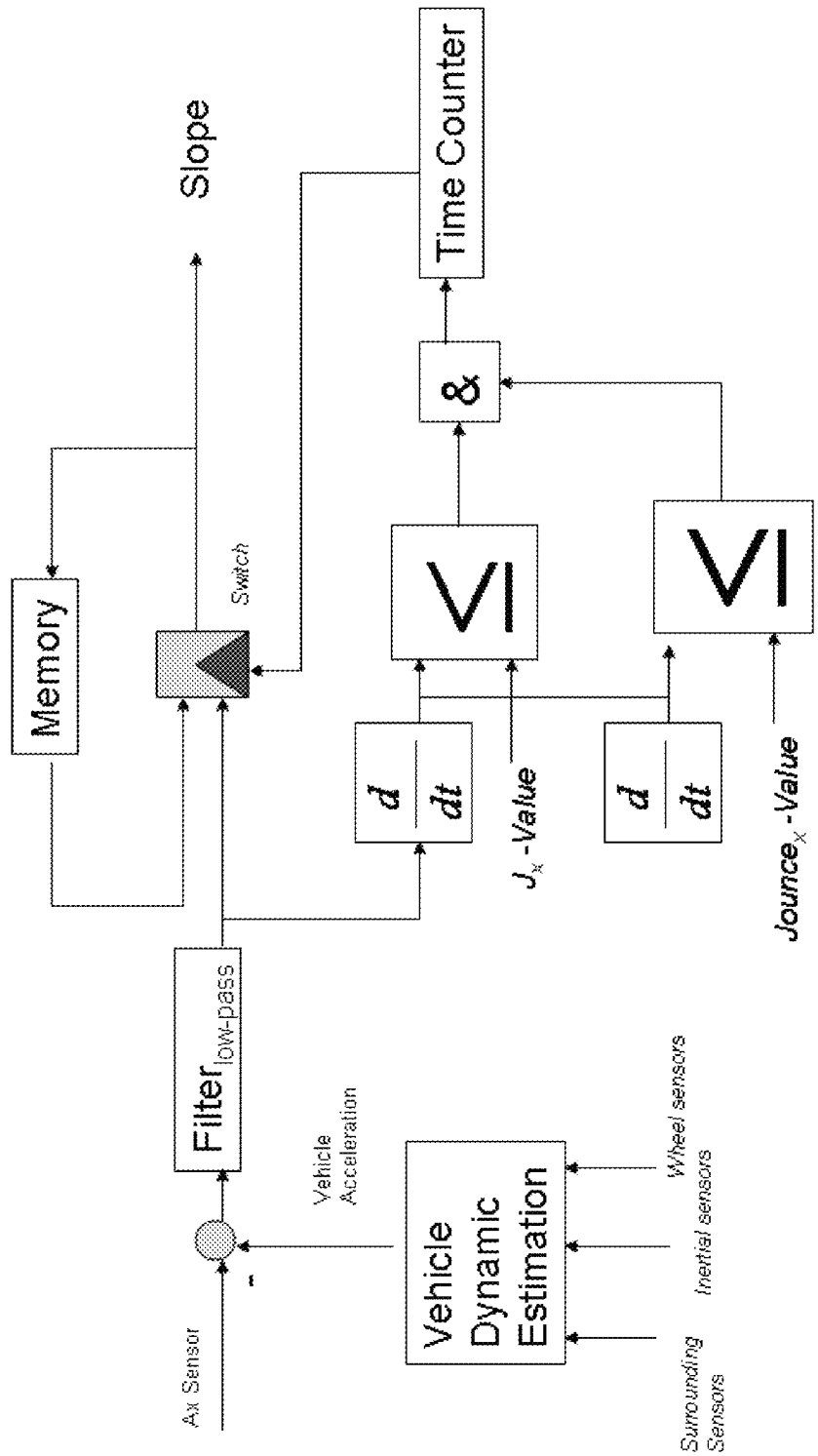
FIG. 3 is a schematic diagram of an Ax slope calculation.

FIG. 3 is a schematic representation of the Ax slope calculation. The slope is calculated using the following algorithm:

$$\text{Slope} \begin{cases} AxSensor - a_x; & \text{if } |J_x| \le Value_{J_x} \cap |Jounce_x| \le Value_{Jounce_x} \\ & \text{is met over a defined period of time} \\ Slope_{t-1}; & \text{In any other case} \end{cases}$$

Where $$J_x = \frac{d}{dt}\text{Slope}$$

$$Jounce = \frac{d}{dt}J_x$$

HHD does not increase the brake force. HDD only maintains and releases, in a controlled manner, the brake force during HHD activation.

Figure 4:
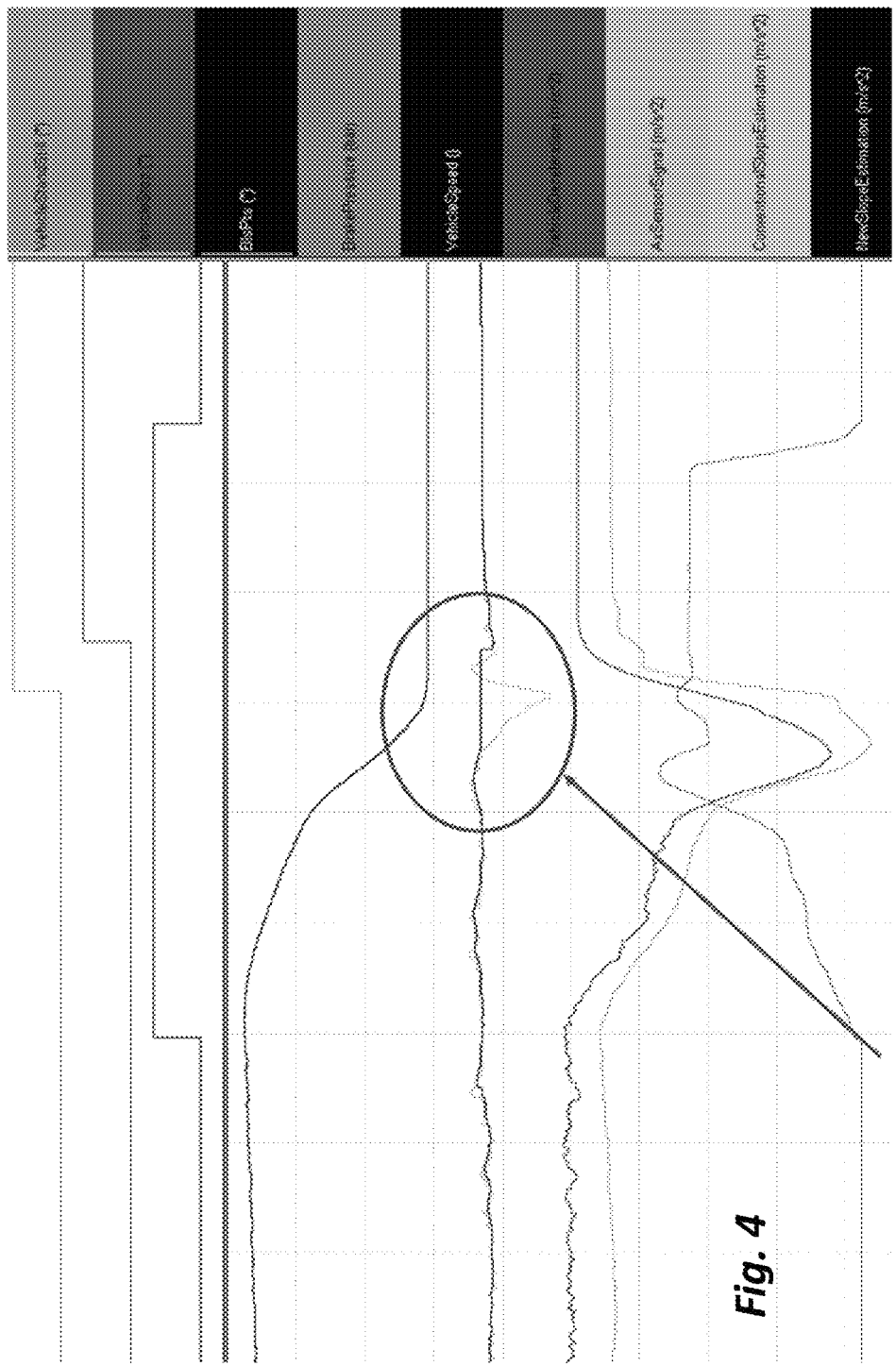
FIG. 4 is graph of a vehicle coming to a standstill with the brakes applied normally.
Figure 5:
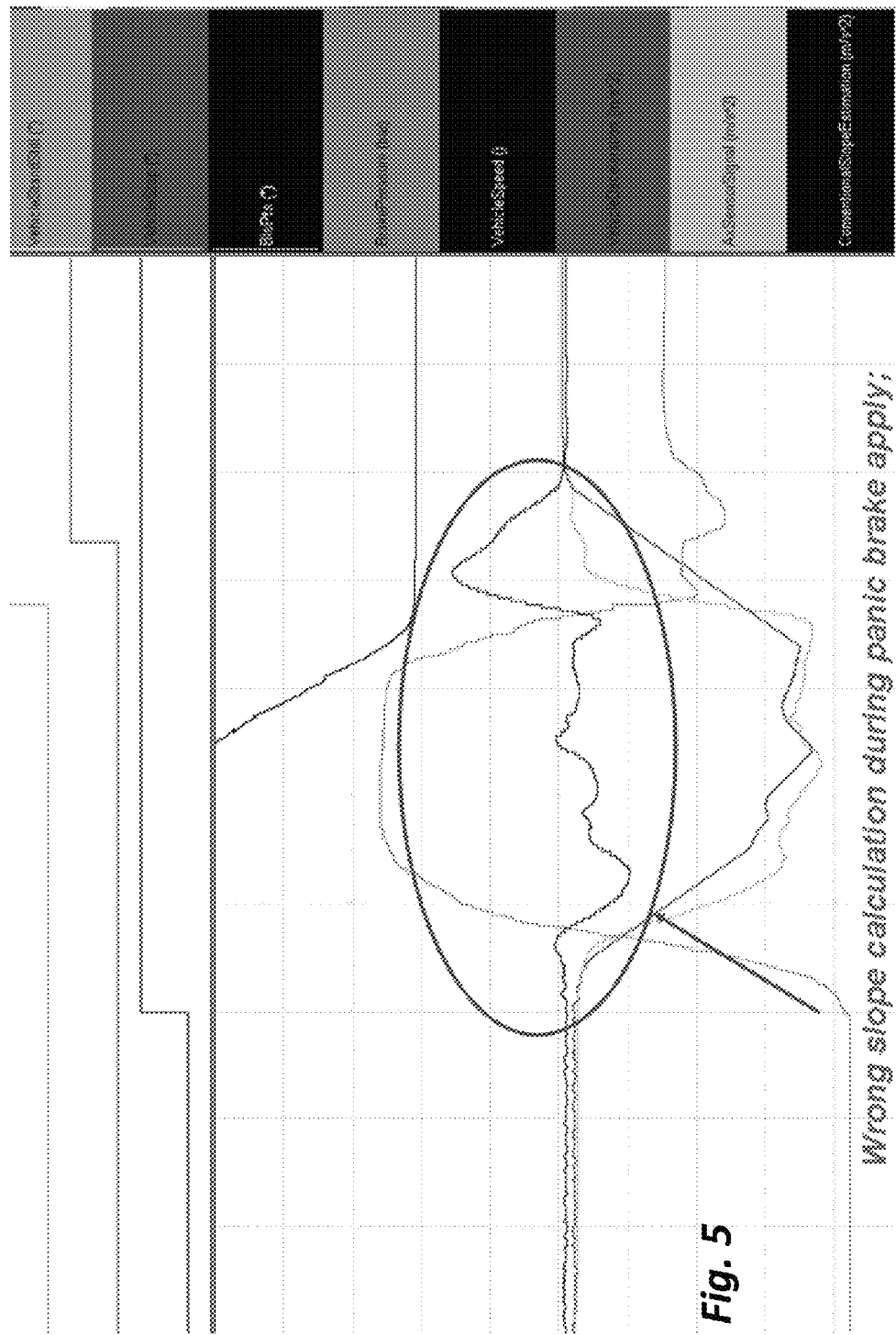
FIG. 5 is graph of a vehicle coming to a standstill with the brakes applied in a panic mode.

The objective for calculation of the slope is to avoid false and unnecessary activation of the HHD due to wrong slope estimation. FIGS. 4 and 5 show the nature of the problem. FIG. 4 shows the vehicle coming to a standstill with the brakes applied normally. FIG. 5 shows the vehicle coming to a standstill with the brakes applied in a panic mode.

The objective of the HHD is to provide a comfortable drive off down a steep slope. The function doesn't request more brake force than what is already requested by the driver; it just controls a different decrease in brake force rates to provide feeling of control to the driver.

The decrease of the brake force depends on the slope, vehicle velocity and driver interaction with gas pedal. The objective of HHD is to achieve a constant acceleration state with a steady increase of the speed avoiding uncomfortable jerk to the driver during drive off The slope calculation method reduces false activation of vehicle hold functions on flat ground. The slope calculation method also provides a reliable estimation of the slope before the vehicle comes to standstill, allowing early HHD activation.

The slope calculation method provides a filter for external perturbation in the ax sensor signal.

Figure 6:
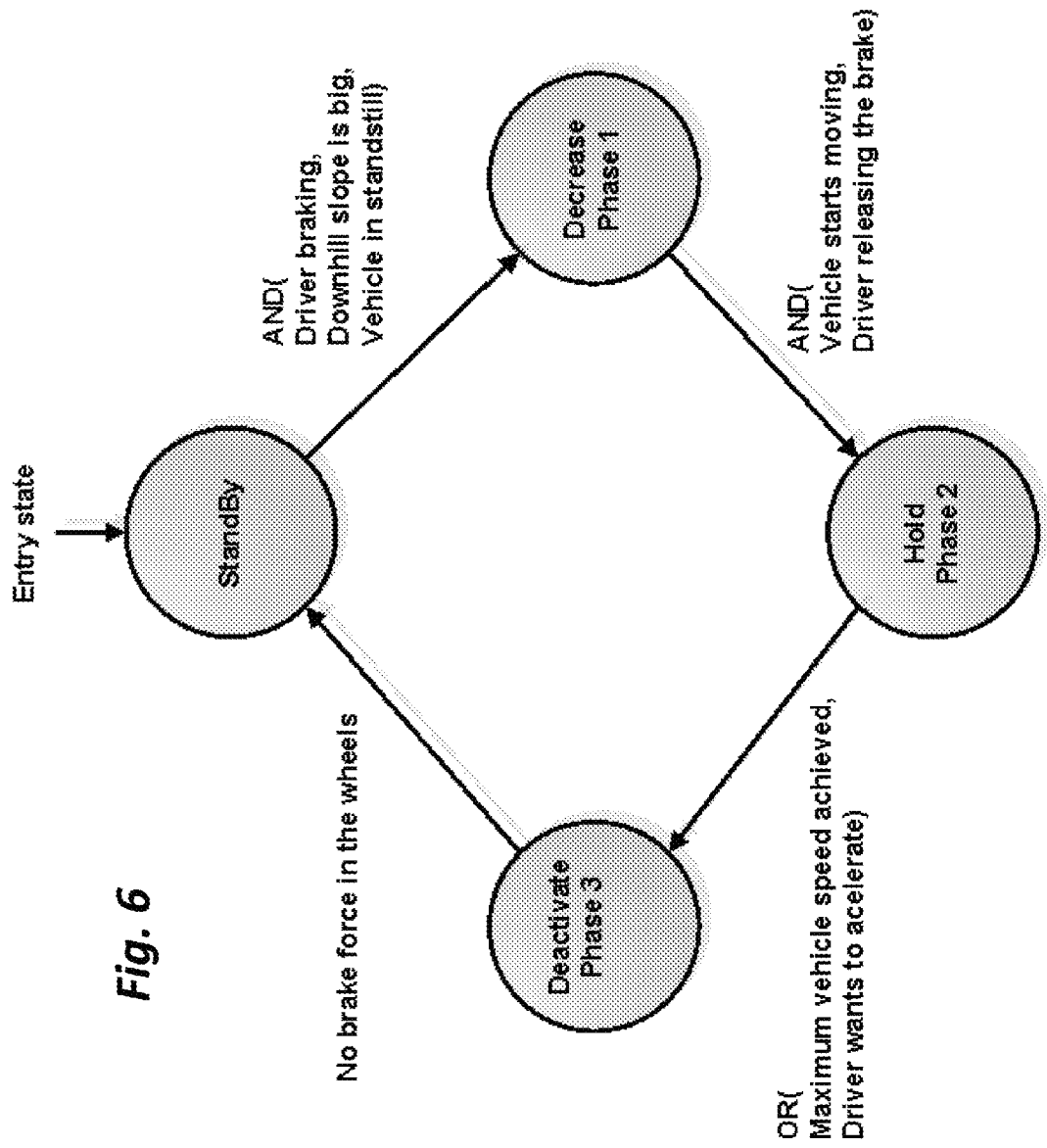
FIG. 6 is a state diagram of an HHD operation.

FIG. 6 shows a state diagram of the operation of an HHD. The HHD begins in a "StandBy" State. The main requirements for activation of HHD are checked in this state. The signals indicating vehicle standstill, brake force build-up by the driver via brake pedal, and downhill grade are monitored in this state. Once all these criteria are met, the HHD function becomes active and jumps into the "Decrease" State (Phase 1).

In this state, the initial HHD target brake force is estimated based on slope information and driver brake force request.

Based on the slope information all the required HHD brake force decrease gradients for the different phases are calculated. To produce the same deceleration rate on every allowed slope, the following decrease gradients are calculated:

Decrease rate (phase 1): As soon as the driver starts releasing the brake request, HHD takes over the reduce rate of brake force. This rate applies as long as the vehicle is not moving.

Decrease rate (phase 2): The brake torque request is reduced with this rate as long as the minimum speed is not reached.

"Hold" rate (phase 2): when the vehicle speed is within allowed range as shown in the FIG. 1 the brake force is held at this small rate.

Deactivation rate (phase 3): as soon as the maximum vehicle speed is reached or the driver presses the accelerator pedal for drive off, the HHD function is deactivated.

In the "Hold" State (Phase 2), the vehicle is moving and a target brake request is decreased either at a slow "Hold" rate or at a higher "Decrease rate (phase 2)". As described above, the rate is determined based on the vehicle speed. If the speed is below the minimum threshold, but the vehicle is still moving, the higher rate is used to allow the vehicle pick up some speed. As soon as the vehicle is with the allowed range, the brake request is held or reduced at a slow rate.

In this "Deactivation" State (Phase 3), the brake request is quickly reduced to deactivate the function and allow a drive off of the vehicle. This happens when the maximum vehicle speed is reached or the driver presses the accelerator pedal for drive off Thus, the invention provides, among other things, a HDD system for controlled acceleration of a vehicle as it coasts down a hill. Various features and advantages of the invention are set forth in the following claims.

What is claimed is:

1. A hill hold decay (HDD) system of a vehicle, the system comprising:
   a longitudinal acceleration sensor configured to detect the longitudinal acceleration of the vehicle;
   a wheel speed sensor configured to detect the speed of the vehicle;
   a brake pedal detector configured to detect a pressure applied to a brake pedal;
   a gas pedal detector configured to detect a pressure applied to a gas pedal;
   a gear sensor configured to sense a gear the vehicle is in; and
   a controller configured to receive an indication of the longitudinal acceleration of the vehicle from the longitudinal acceleration sensor, an indication of the speed of the vehicle from the wheel speed sensor, an indication of the pressure on the brake pedal from the brake pedal detector, an indication of the pressure on the gas pedal from the gas pedal sensor, and an indication of the gear the vehicle is in from the gear sensor, the controller further configured to
   determine the vehicle has come to a standstill;
      after determining the vehicle has come to a standstill
         determine a slope of the ground the vehicle is on;
         determine a direction of travel of the vehicle is downhill;
         detect a release of the brake pedal;
         release a brake force applied to a plurality of wheels of the vehicle at a constant first rate;
         determine a speed of the vehicle has reached a minimum threshold;
         after determining the speed of the vehicle has reached the minimum threshold;
            release the brake force at a second rate as long as the speed of the vehicle is increasing;
            determine the speed of the vehicle has reached a maximum threshold; and
            after determining the speed of the vehicle has reached the maximum threshold, release the brake force.

2. The HDD system of claim 1, further comprising detecting a drive off condition and releasing the brake force immediately.

3. The HDD system of claim 2, wherein the drive off condition is detected when a gas pedal is pressed.

4. The HDD system of claim 1, wherein the method is not executed if the slope of the ground is less than a predetermined slope threshold.

5. The HDD system of claim 1, wherein the brake force is reduced after the speed of the vehicle has reached the minimum if the vehicle slows down.

6. The HDD system of claim 1, wherein the slope is determined using the formula $$\text{Slope} \begin{cases} AxSensor - a_x; & \text{if } |J_x| \leq Value_{J_x} \cap |Jounce_x| \leq Value_{Jounce_x} \\ & \text{is met over a defined period of time} \\ Slope_{t-1}; & \text{In any other case} \end{cases}$$

where $$J_x = \frac{d}{dt}\text{Slope}$$

$$Jounce = \frac{d}{dt}J_x.$$

7. The HDD system of claim 1, wherein the first rate of brake force release is determined based on the determined slope.

8. The HDD method of claim 1, wherein the second rate is zero, holding the brake force steady.

9. A HHD method for controlled acceleration of a vehicle, the method comprising:
   determining the vehicle has come to a standstill;
   after determining the vehicle has come to a standstill
      determining a slope of the ground the vehicle is on;
      determining a direction of travel of the vehicle is downhill;
      detecting a release of a brake;
      releasing a brake force applied to a plurality of wheels of the vehicle at a constant first rate;
      determining a speed of the vehicle has reached a minimum threshold;
      after determining the speed of the vehicle has reached the minimum threshold;
         releasing the brake force at a second rate as long as the speed of the vehicle is increasing;
         determining the speed of the vehicle has reached a maximum threshold; and
         after determining the speed of the vehicle has reached the maximum threshold, releasing the brake force.

10. The HDD method of claim 9, further comprising detecting a drive off condition and releasing the brake force immediately.

11. The HDD method of claim 10, wherein the drive off condition is detected when a gas pedal is pressed.

12. The HDD method of claim 9, wherein the method is not executed if the slope of the ground is less than a predetermined slope threshold.

13. The HDD method of claim 9, wherein the brake force is reduced after the speed of the vehicle has reached the minimum if the vehicle slows down.

14. The HDD method of claim 9, wherein the release of the brake is a release of a brake pedal.

15. The HDD method of claim 9, wherein the direction of travel of the vehicle is determined by a selected gear of the vehicle.

16. The HDD method of claim 9, wherein the slope is determined using the formula $$Slope \begin{cases} AxSensor - a_x; & \text{if } |J_x| \leq Value_{J_x} \cap |Jounce_x| \leq Value_{Jounce_x} \\ & \text{is met over a defined period of time} \\ Slope_{t-1}; & \text{In any other case} \end{cases}$$

where $$J_x = \frac{d}{dt} Slope$$

$$Jounce = \frac{d}{dt} J_x.$$

17. The HDD method of claim 9, wherein the first rate of brake force release is determined based on the determined slope.

18. The HDD method of claim 9, wherein the second rate is zero, holding the brake force steady.

* * * * *